E. A. FILLMAN.
WATER TANK HEATER.
APPLICATION FILED MAR. 2, 1917.
1,239,263. Patented Sept. 4, 1917.
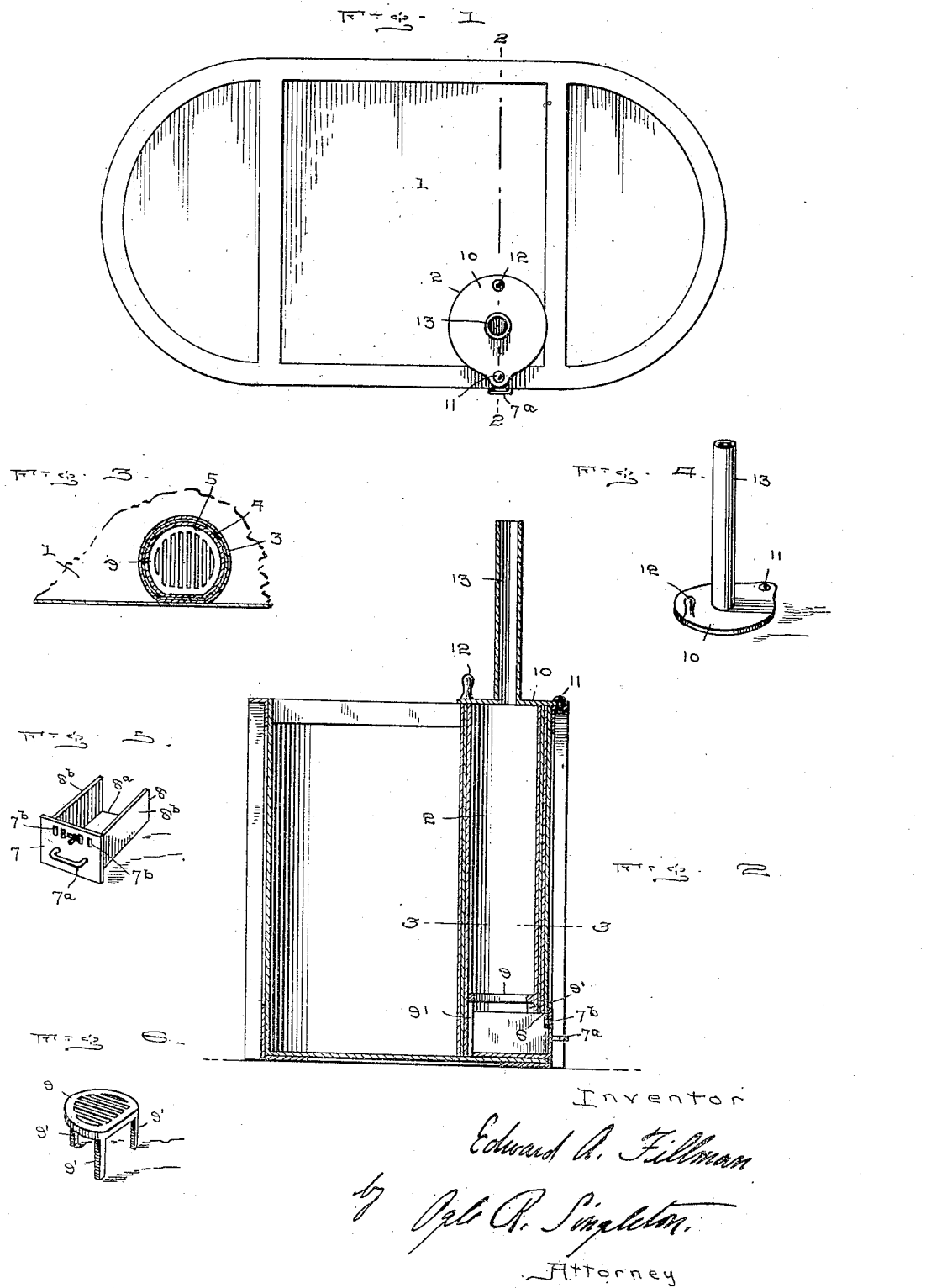

UNITED STATES PATENT OFFICE.

EDWARD A. FILLMAN, OF MONMOUTH, ILLINOIS.

WATER-TANK HEATER.

1,239,263.  Specification of Letters Patent.  Patented Sept. 4, 1917.

Application filed March 2, 1917. Serial No. 152,012.

*To all whom it may concern:*

Be it known that I, EDWARD A. FILLMAN, citizen of the United States, residing at Monmouth, in the county of Warren and State of Illinois, have invented certain new and useful Improvements in Water-Tank Heaters, of which the following is a specification.

My invention consists in a new and useful improvement in water tank heaters and is adapted more particularly for that form of heater intended for use with portable water tanks commonly used for watering stock in the field. The purpose of my invention is to provide a simple and efficient heater which may be built integral with the tank so as to prevent the possibility of overturning the heater, and thus destroying the fire therein and fouling the water thereby. The novel features comprised in my heater are requisite in a heater of this character, to provide efficient means for securing the proper heat when the heater is in use and also for thorough cleansing of the heater after its use, without danger of fouling such water as may remain in the tank. To secure the proper heat as aforesaid I provide my heater with an interior wall of sheet iron adapted to withstand any excessive degree of heat generated by said heater, with a casing of asbestos designed to temper the distribution of the heat, and with an outer casing of galvanized iron designed to protect the heater and to resist rust from the action of the water in the tank. To cleanse the heater I have provided an opening communicating to the interior of the heater at its bottom, without communication with the interior of the tank, through which the refuse of combustion may be readily and completely removed when desired. In this connection I have provided a novel form of ash pan, having a bottom, two sides, and an outer end provided by a door, covering the opening in the heater, by which the ash pan may be removed from the heater and replaced therein. The fact that this pan has no wall at its inner end constitutes it a shovel when it is replaced within the heater to collect therein such of the refuse within the heater as may have escaped from the pan when it was withdrawn from the heater.

My invention is fully disclosed in the details of construction hereinafter pointed out.

In the drawings:

Figure 1 is a top plan view of the device.

Fig. 2 is a vertical section on the line 2—2, Fig. 1.

Fig. 3 is a horizontal section of a portion of the device on the line 3—3, Fig. 2.

Fig. 4 is a perspective view of the top of the heater.

Fig. 5 is a perspective view of the door and ash pan of the heater.

Fig. 6 is a perspective view of the grate of the heater.

In the drawings:

The numeral 1 designates a tank designed to contain water, attached to the inner side of which is the heater 2, having a cylindrical body composed of three walls, namely, the outer jacket 3 of galvanized iron and the inner packing 4 of asbestos and an inner casing 5 of sheet iron. The body of the heater 2 extends vertically from the top of the tank to the bottom. At the bottom of the heater upon the side adjoining the wall of the tank there is provided the opening 6 through the walls of the heater and tank. A door 7, having a handle $7^a$ and an ordinary heater draft $7^b$, is provided for closing the opening 6 when the heater is in use. Attached to this door 7 is an ash pan 8 which is provided with a bottom $8^a$ and two side walls $8^b$ located one on either side of the bottom $8^a$. Placed at the bottom of the heater is the removable grate 9 having three legs 9′ so disposed as to permit the ash pan 8 to be placed under grate 9 and removed therefrom. Resting upon the upper edge of the cylindrical body of the heater is the top 10 which is held in place by a pin 11 bolted to the frame of the tank 1 so as to permit the top 10 to be revolved about the pin 11 so that same may be swung on to and off of the top of the heater 2 by means of the handle 12. The top 10 is provided with a flue 13 opening therethrough to provide a draft for the heater 2.

Having described my invention what I claim is:

1. The combination of a portable water tank, adapted to water stock; a heater, located wholly within and integral with said tank, adapted for the combustion of solid fuel, and provided with an inner wall composed of material adapted to resist high temperature, an outer wall composed of material adapted to resist corrosive action of water, and a packing interposed between said walls adapted to protect the outer wall from the effect of high temperature; an opening through the wall of said tank and the walls of the heater; a door therefor; and an ash pan attached to the inner face of said door and having a bottom and two side walls only.

2. The combination of a portable water tank, adapted to water stock; a heater, located wholly within and integral with said tank, adapted for the combustion of solid fuel, and provided with a body composed of three walls, namely, an outer wall of galvanized iron, an inner casing of asbestos and an inner wall of sheet iron; an opening through the wall of said tank and the walls of the heater; a door therefor; and an ash pan attached to the inner face of said door and having a bottom and two side walls only.

In testimony whereof I affix my signature in the presence of two witnesses.

EDWARD A. FILLMAN.

Witnesses:
F. M. HALLAM,
S. S. HALLAM.

Copies of this patent may be obtained for five cents each, by addressing the "Commissioner of Patents, Washington, D. C."